Jan. 7, 1936.    E. W. SMITH    2,027,310

SECONDARY OR STORAGE BATTERY

Filed Aug. 23, 1935

WITNESS:
Robt R Kitchel.

INVENTOR
Edward W. Smith
BY
Augustus B. Stoughton
ATTORNEY.

Patented Jan. 7, 1936

2,027,310

UNITED STATES PATENT OFFICE 2,027,310

SECONDARY OR STORAGE BATTERY

Edward W. Smith, Philadelphia, Pa., assignor to The Electric Storage Battery Company, Philadelphia, Pa., a corporation of New Jersey Application August 23, 1935, Serial No. 37,436

7 Claims. (Cl. 136—177)

This invention relates to storage battery cells and its primary object is to provide such a cell which is free from liability to explosion, which liability exists in prevailing types of such cells when oxygen and hydrogen are being given off toward the end of the charging period.

In storage battery cells as ordinarily constructed, the elements are assembled in containers provided with covers sealed to the walls of the containers and provided with openings through which the terminals pass with an air tight seal,—a small vent opening being provided through the cover to permit the escape of gas. The electrolyte level is maintained, by the addition of water when necessary, at a level appreciably below the under side of the cover, thus allowing a space between the electrolyte and the cover for the collection of the hydrogen and oxygen given out during the gassing period, thus forming a pocket of explosive gas of sufficient volume to cause a violent explosion if accidentally ignited. Such explosions while of rare occurrence are in fact of sufficient violence to shatter the containers, thus causing considerable personal risk to any attendants who may be near by and in addition spilling all the electrolyte and thus putting the cell out of commission and rendering useless the whole battery of which the exploded cell forms but one unit.

My invention is designed to prohibit the possibility of the collection of any appreciable amount of explosive gases, thus eliminating all danger from such explosions. This and other objects of the invention will be more clearly seen by reference to the following description taken in connection with the accompanying drawing.

Figure 2:
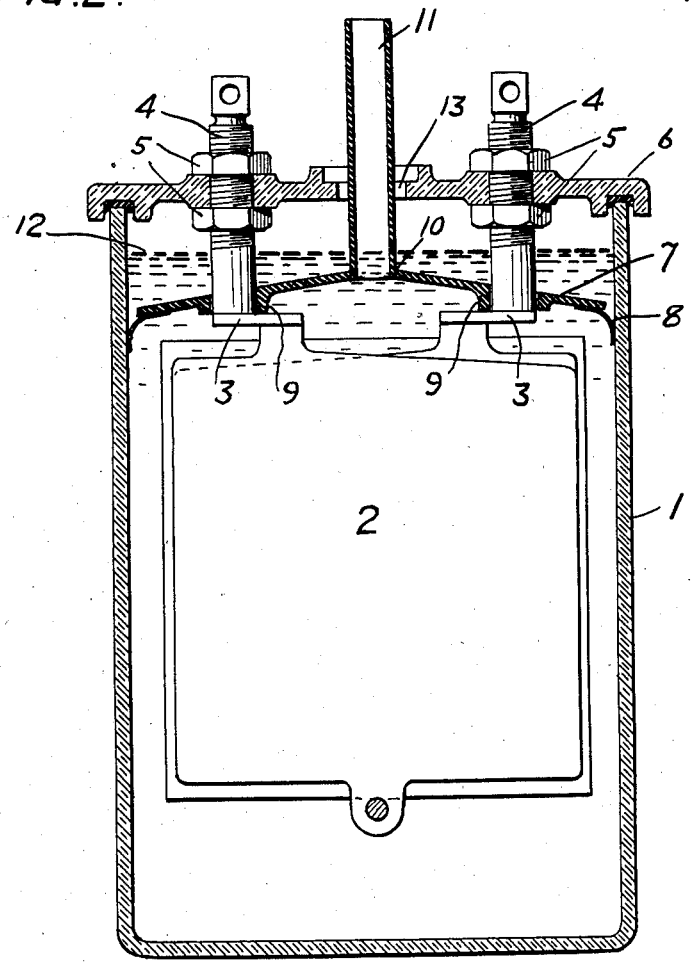
Figs. 2 and 3 show in section stoppers for use in shipping the cell.

In the drawing 1 represents the container for the storage battery cell of glass, hard rubber or other suitable material. 2 represents the plate element consisting of positive and negative plates and suitable separators suspended from straps 3 from which extend upwardly the terminal posts 4 threaded along their upper ends to receive the lock nuts 5 which clamp the posts to the cover 6, the latter resting on the upper edges of the container 1. The cover is also provided with a central opening 13. The level of the electrolyte in the cell is indicated at 12.

My improvement consists in the use of a supplementary or gas cover 7 which is fitted directly over the plate element, as shown. The cover is made slightly dished up toward the center; is provided with holes through which the posts 4 are inserted; and is made to fit closely to the interior of the container by means of flexible skirts 8, composed of soft rubber or other suitable material. At the holes through which the posts 4 are inserted, the gas cover is provided at its lower side with bosses 9, for the purpose of diverting any gas bubbles around the holes and thus preventing them from coming up through the slight clearance space between the holes and the posts; and at the highest point of the gas cover, a hole 10 is provided, into which vent tube 11 is fitted. The gas cover 7 and the vent tube 11 may be made of any suitable material, such as hard rubber, celluloid, or one of the Vynal compounds.

In the operation of the cell, the electrolyte is maintained, by the addition of water, at the level 12, above the gas cover, so that all of the slight openings where the posts pass through the cover and where the soft skirts 8 contact with the container will always have a liquid seal. During periods of overcharge, while oxygen and hydrogen are being given off from the plates, the bubbles of gas rise until they reach the gas cover, then flow along together until they reach the highest point and escape thru the vent tube 11. There is, therefore, little or no explosive gas which can reach the main space between the electrolyte level 12 and the cover 6, and any gas which may reach this space is in such small quantity that it may diffuse through an opening provided for filling the cell with water as at the annular space 13 or other opening provided especially for the purpose. Since there is no gassing occurring in this upper chamber, no acid spray is given off from it and hence openings may be provided for vent purposes without any risk of introducing acid spray into the outside atmosphere. The explosive gas flowing up the inclined surface of the gas cover to vent tube 11 immediately escapes to the atmosphere and hence, although the tube itself may contain a rich explosive mixture, the volume of explosive gas is so slight that its ignition can cause no injury whatever to the cell as a whole, and in point of fact, it has been found by actual test that the gas may be ignited from time to time without in any way disturbing or injuring the cell.

A second object attained by this arrangement has to do with the replacing of electrolyte lost by decomposition and evaporation. This replacement is accomplished by adding water to the top of the cell in the ordinary way, but the effect of the gas cover is very marked as follows. When water is added to the electrolyte of the ordinary cell it rapidly mixes, thus diluting the electrolyte and reducing its specific gravity. Since specific gravity provides one of the most useful means of ascertaining the relative condition of charge and discharge of storage battery cells, this alteration, caused by the addition of water, is always misleading and as a consequence the amount of water which may be added at any one time is limited to such amount as will not greatly change the specific gravity. This limitation, in turn, means that the periods for filling must be somewhat frequent, depending, of course, on the service to which the cell is applied and whether there is much gassing during its operation.

The gas cover 7, by reason of the flexible skirt 8, forms a fairly tight seal with the container and hence retards, almost to the point of prevention, mixture between the liquid above and below it; that is to say, when water is added to the space above, this water does not immediately mix with the acid below, and therefore does not change its specific gravity so that readings of the latter are not affected and may be relied upon to an extent heretofore not obtainable. The fact that this water does not mix also permits of an addition of considerable quantity at one time and thus means that the intervals between filling may be very much extended, as compared to present practice.

It will be noted however that as the volume of electrolyte below the gas cover 7 is reduced by electrolytic decomposition, the water above the cover will be gradually forced down through the minute space between the skirt 8 and the jar wall but this will occur very gradually and the water thus introduced will be thoroughly mixed with the electrolyte by the convection currents caused by the gassing.

The fact that there is not a perfectly tight seal between the skirt 8 and the wall of the jar results in maintaining the level of the electrolyte in the vent tube 11 at about the same height as that maintained above the gas cover 7.

Figure 3:
Figure 1:
Fig. 1 is a vertical section through a battery cell.

The cell as shown would not be suitable for shipment since acid would splash through the annular opening 13, or even through the vent tube 11. To make it suitable for shipment, a stopper, Figure 2, may be inserted, surrounding the vent tube 11 and fitting into the cover so as to completely close the annular space 13, while a smaller stopper, Figure 3, having a small vent opening, may be inserted in tube 11; or an alternative arrangement is to remove entirely the vent tube 11 from the cover 7 and insert in its place a stopper which completely closes the opening in the cover except for a minute vent opening to allow for the escape of small quantities of gas. To provide for this, the tube 11 would have screw thread engagement with the cover.

It will be observed to those skilled in the art that modifications may be made in details of construction and arrangement without departing from the spirit of the invention which is not limited to such matters or otherwise than the prior art and the appended claims may require.

I claim:—

1. In a storage battery cell, the combination with a container, a plate element and a sealed-on closure having an opening, of a gas cover mounted directly over the plate element and arranged to collect the gas given off by charging, said gas cover having a vent tube passing through said opening and adapted to carry off the gas without accumulation of substantial amounts of said gas.

2. In a storage battery cell, the combination with a container containing electrolyte having a normal level, a plate element, and a sealed-on closure having an opening of a gas cover mounted directly over the plate element and below the normal electrolyte level and arranged to collect the gas given off by charging, said gas cover having a vent tube passing through said opening and adapted to carry off the gas without accumulation of substantial amounts of said gas.

3. In a storage battery cell, the combination with a container, a plate element and a sealed-on closure having an opening, of a gas cover mounted directly over the plate element and arranged to collect the gas given off by charging, said gas cover having a vent tube passing through said opening and adapted to carry off the gas without accumulation of substantial amounts of said gas, said gas cover having a flexible skirt closely fitting the interior container walls.

4. In combination in a storage battery cell a plate element with its terminal posts, a container containing electrolyte having a normal level and provided with a closure sealed to the top thereof, said closure having suitable openings to receive the posts and having a vent and filling opening therein, and a supplementary gas cover located above the plate element and below the normal electrolyte level, said cover closely fitting the interior walls of the container and having openings closely fitting the terminal posts and having a vent opening provided with a vent tube passing through the vent and filling opening of the closure.

5. A storage battery cell including a closure vented to the atmosphere and a plate structure and containing electrolyte of which the level lies above the plate structure and is spaced below the cover, in combination with a supplementary cover arranged below the level of the electrolyte and vented to the atmosphere independently of the first mentioned cover.

6. A storage battery cell having covers spaced apart and independently vented to the atmosphere and of which one is arranged at the top of the cell and of which the other is arranged below the level of the electrolyte in the cell and above the plate structure of the cell to provide a water space above and a gas catcher below.

7. A storage battery cell having covers spaced apart and of which one has a filling opening and is arranged at the top of the cell and of which the other is arranged below the level of the electrolyte in the cell and above the plate structure of the cell and is provided with a vent tube extending through and beyond the filling opening.

EDWARD W. SMITH.